United States Patent
Burke et al.

(10) Patent No.: US 7,007,708 B2
(45) Date of Patent: Mar. 7, 2006

(54) FLOW CONTROL VALVE

(75) Inventors: David Howard Burke, Flint, MI (US); Sharon Elizabeth Beyer, Grand Blanc, MI (US)

(73) Assignee: Delphi Techonologies, Inc., Troy, MI (US)

( * ) Notice: Subject to any disclaimer, the term of this patent is extended or adjusted under 35 U.S.C. 154(b) by 263 days.

(21) Appl. No.: 10/688,235

(22) Filed: Oct. 17, 2003

(65) Prior Publication Data

US 2005/0081928 A1    Apr. 21, 2005

(51) Int. Cl.
*F16K 17/18* (2006.01)

(52) U.S. Cl. .................. 137/12; 123/506; 123/511; 137/118.06; 137/493.7; 137/513.5; 137/565.13; 137/565.22

(58) Field of Classification Search .............. 137/12, 137/118.06, 493.7, 513.5, 565.13, 565.22; 123/506, 511

See application file for complete search history.

(56) References Cited

U.S. PATENT DOCUMENTS

| | | | |
|---|---|---|---|
| 3,580,275 A | 5/1971 | Hanson et al. | |
| 3,589,517 A | 6/1971 | Palmi | |
| 3,626,977 A | 12/1971 | Riley et al. | |
| 3,705,600 A | 12/1972 | Heggen | |
| 3,721,264 A | 3/1973 | Coughlin | |
| 3,747,626 A | 7/1973 | Valentino | |
| 3,913,601 A | 10/1975 | Hanson | |
| 3,976,096 A | 8/1976 | Kass | |
| 4,135,541 A | 1/1979 | Lorimor | |
| 4,176,688 A | 12/1979 | Schwerin | |
| 4,204,560 A | 5/1980 | Eriksen | |
| 4,316,504 A | 2/1982 | Baker et al. | |
| 4,341,239 A | 7/1982 | Atkinson | |
| 4,457,333 A | 7/1984 | Sharp | |
| 4,539,959 A * | 9/1985 | Williams | 123/456 |
| 4,648,369 A | 3/1987 | Wannenwetsch | |
| 4,773,444 A * | 9/1988 | Bleth et al. | 137/493 |
| 4,778,595 A | 10/1988 | Sable et al. | |
| 4,917,795 A | 4/1990 | Sable et al. | |
| 4,948,092 A | 8/1990 | Kasper et al. | |
| 5,086,613 A | 2/1992 | Fox et al. | |
| 5,143,115 A | 9/1992 | Geyler, Jr. | |
| 5,289,810 A * | 3/1994 | Bauer et al. | 123/510 |
| 5,477,829 A | 12/1995 | Hassinger et al. | |
| 5,577,970 A | 11/1996 | Smith et al. | |
| 5,700,213 A | 12/1997 | Simpson et al. | |
| 5,707,309 A | 1/1998 | Simpson | |
| 5,797,374 A * | 8/1998 | Minagawa et al. | 123/497 |
| 5,931,132 A | 8/1999 | Freeland | |

(Continued)

*Primary Examiner*—Stephen M. Hepperle
(74) *Attorney, Agent, or Firm*—Jimmy L. Funke

(57) ABSTRACT

A valve mechanism to control fluid flow between a fluid pumping device and a system that includes an inlet from the fluid pumping device, a first valve, a second valve, a first outlet fluidly connected to the system, and a second outlet. The first valve prevents backflow of fluid when the fluid pumping device discontinues pumping fluid to the system. The second valve checks fluid flow through the valve to the first outlet when fluid pressure at the inlet is less than a first predetermined pressure. The second valve permits fluid flow from the pump through the valve to the system only when fluid pressure at the inlet is greater than the first predetermined pressure. The second valve prevents fluid pressure in the system from substantially exceeding a second predetermined pressure when the pumping device is not pumping fluid to the system.

9 Claims, 2 Drawing Sheets

U.S. PATENT DOCUMENTS

| | | | |
|---|---|---|---|
| 6,068,022 A | * | 5/2000 | Schultz et al. ............... 137/538 |
| 6,131,606 A | | 10/2000 | O'Neill |
| 6,136,183 A | | 10/2000 | Suzuki et al. |
| 6,283,885 B1 | | 9/2001 | Irwin |
| 6,322,468 B1 | | 11/2001 | Wing et al. |
| 6,352,067 B1 | * | 3/2002 | Genslak ...................... 123/510 |
| 6,581,639 B1 | | 6/2003 | Fiala et al. |
| 2001/0006917 A1 | | 7/2001 | Hashimoto |
| 2001/0032675 A1 | | 10/2001 | Russell |
| 2003/0056832 A1 | | 3/2003 | Seitz |

\* cited by examiner

FLOW CONTROL VALVE

TECHNICAL FIELD

This invention pertains generally to fluid flow control valves, and more specifically to a valve mechanism to control fluid flow between a fluid pumping device and a pressurized system.

BACKGROUND OF THE INVENTION

A typical fluid delivery system includes a pumping device which pumps fluid from a reservoir under pressure to a system for use. An example of such a system is a fuel delivery system for an internal combustion engine, wherein fuel stored in a fuel tank is pumped to a fuel system for delivery to operate the engine. In a conventional fuel system for a spark ignition engine, the expected system operating pressure is 300 kPa to 400 kPa for fuel flow levels ranging from about 0 grams/second to in excess of 40 grams/second. When the fuel delivery system is a demand fuel system, i.e. wherein there is unidirectional fuel flow to the fuel system with no return line, volumetric flow to the fuel system may be managed by varying output of the fuel pump to the fuel system.

Under normal operation of the demand fuel system described above, the valve opens to permit flow of pressurized fluid from the pump to meet demands of the fuel system. Under a situation wherein engine operation changes and reduces demand for pressurized fuel, the fuel pump may reduce or discontinue volumetric flow. Such situations include extended deceleration of the engine, or deceleration of the vehicle employing the engine. Under this situation, there continues to be a need to maintain fuel pressure control in the fuel system. Under situations wherein the fuel system of the engine is exposed to elevated temperature while the engine is turned off, pressure in the system may become elevated. Elevated pressure in the fuel system may lead to an inability to precisely control fuel delivery during a subsequent engine starting event, which may affect emissions and startability.

There is a need to be able to control fluid pressure in a system under a range of pump and system operating conditions. There is a further need to be able to control fluid pressure in a system when the pump is not operating. There is a further need to prevent leakage from the system to the pump, or other areas. When the pump and system is a fuel system for an engine, there is a need to provide motive force for a venturi pump.

SUMMARY OF THE INVENTION

The present invention provides an improvement over conventional valve mechanisms, in that it provides a valve mechanism to control fluid flow between a fluid pumping device and a system that includes an inlet from the fluid pumping device, a first valve, a second valve, and a first outlet fluidly connected to the system, and a second outlet fluidly connected to a venturi pump. The first valve is operable to prevent backflow of fluid from the system when the fluid pumping device discontinues pumping fluid to the system. The second valve is operable to check fluid flow through the valve to the first outlet when fluid pressure at the inlet is less than a first predetermined pressure. The second valve is further operable to permit fluid flow from the fluid pumping device to the inlet and subsequently through the first outlet to the system only when fluid pressure at the inlet is greater than the first predetermined pressure. The second valve is further operable to prevent fluid pressure in the system from substantially exceeding a second predetermined pressure when the pumping device is not pumping fluid to the system. These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
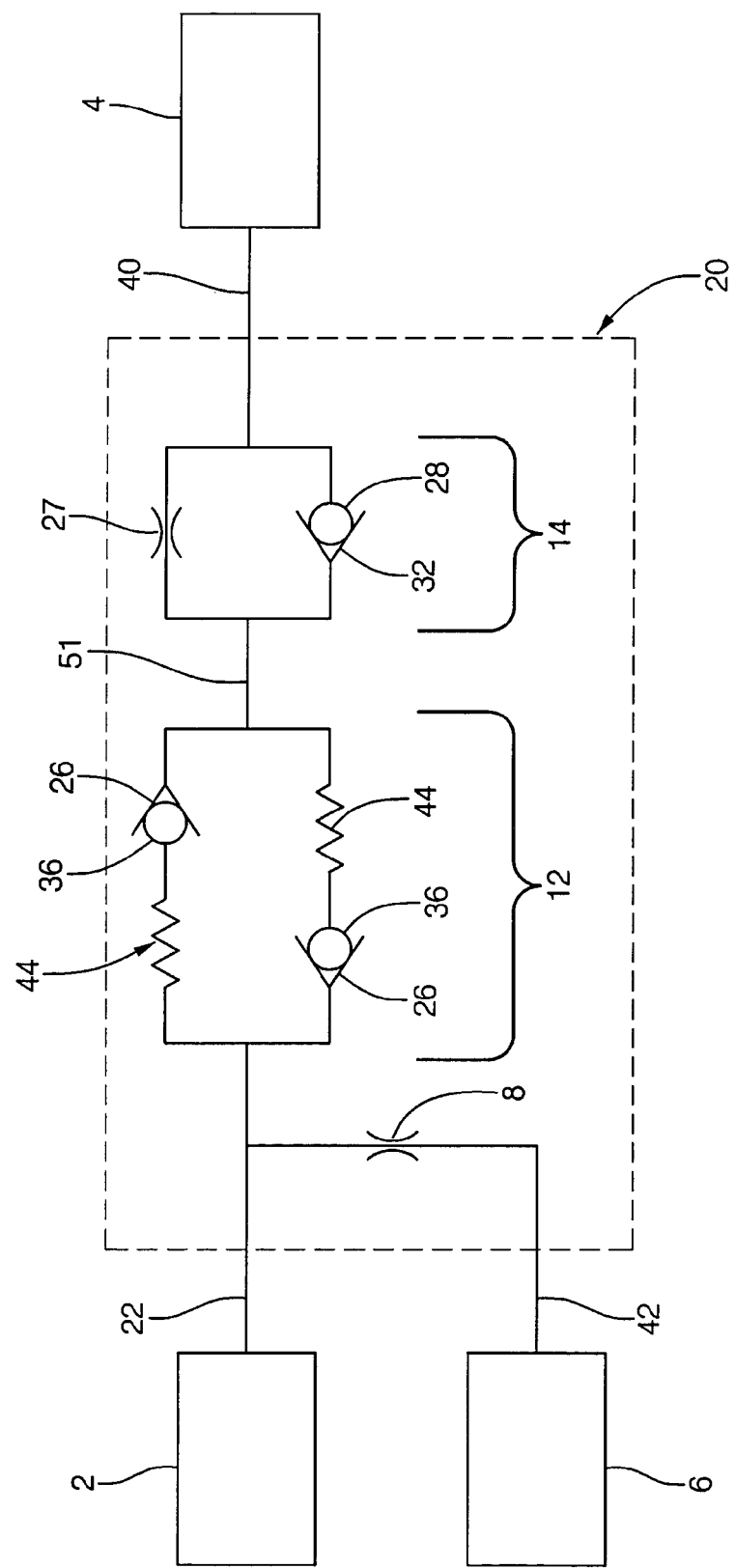
FIG. 1 is a schematic diagram of a system, in accordance with the present invention.

Referring now to the drawings, wherein the showings are for the purpose of illustrating the invention only and not for the purpose of limiting the same, FIG. 1 is a schematic diagram of a system that includes the valve mechanism 20 of the present invention. Included in the schematic is a fluid pumping device 2 that is fluidly connected via a fluid inlet 22 to the valve mechanism 20. The fluid pumping device 2 is operable to input pressurized fluid to the valve mechanism 20 through fluid inlet 22. The valve mechanism 20 comprises a first valve 12, a second valve 14, and a restriction 8. The valve mechanism 20 comprises a first fluid outlet 42 and a second fluid outlet 40. The first fluid outlet 42 is preferably fluidly connected to a device 6, and the second fluid outlet 40 is preferably fluidly connected to a system 4. The device 6 and the system 4 are described hereinafter with reference to a specific embodiment on the invention. The fluid inlet 22 of the valve mechanism 20 is preferably fluidly connected to the first valve 12, which is fluidly connected in series to the second valve 14, the outlet of which comprises the second fluid outlet 40. The fluid inlet 22 of the valve mechanism 20 is also fluidly connected to the restriction 8 in parallel with the first valve 12. The outlet of the restriction 8 comprises the first fluid outlet 42. The first valve 12 comprises a pressure resistance device 44 which is preferably a compression spring, a first valve seat 26, and a sealing end 36. The second valve 14 comprises a ball valve, consisting of a second valve seat 32 and a ball 28, fluidly in parallel with a restricted fluid bypass 27. The valve mechanism 20 is intended to operate in a system described hereinafter with reference to the embodiment shown in FIGS. 2 and 3.

Figure 2:
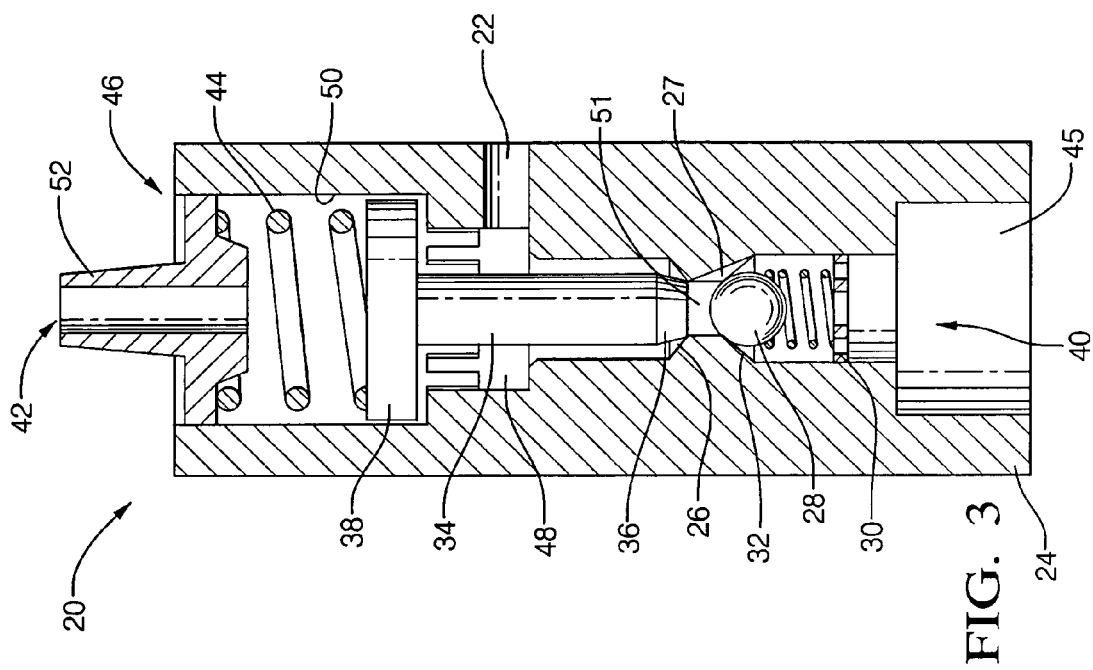
FIG. 2 is a sectional view of an embodiment of the invention, in accordance with the present invention; and, FIG. 3 is a sectional view of an embodiment of the invention, in accordance with the present invention.
Figure 3:
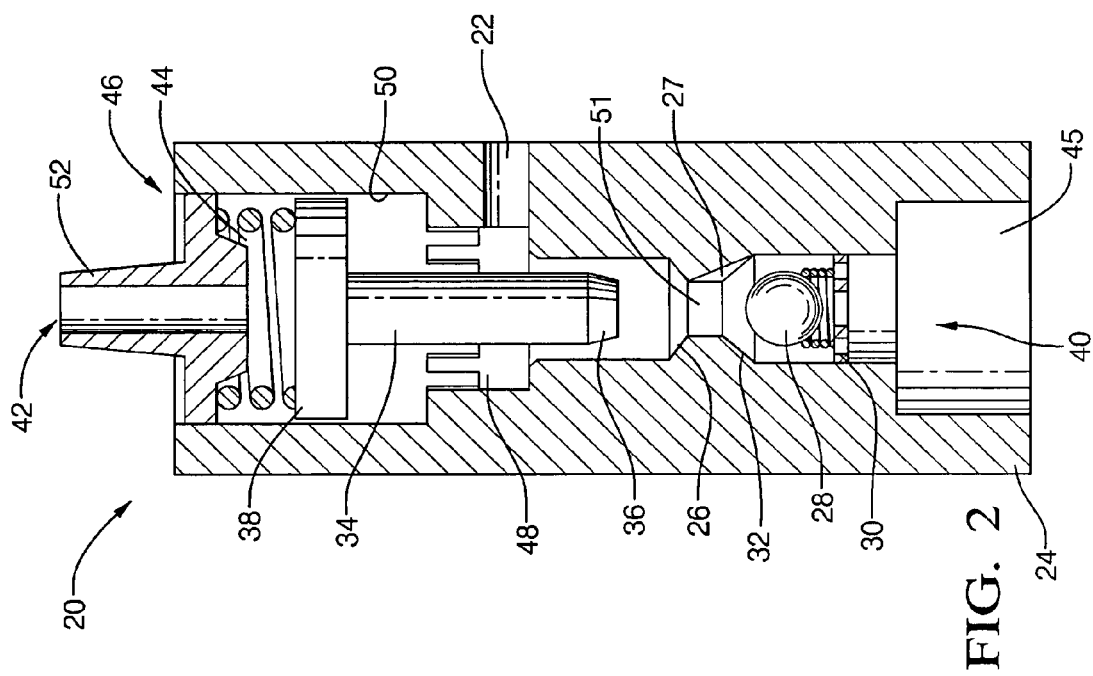

Referring now to FIG. 2 and FIG. 3, the valve mechanism 20 that has been constructed in accordance with an embodiment of the present invention. Reference numbers used in FIG. 2 and FIG. 3 are intended to be consistent with those used in the schematic of FIG. 1 when referring to equivalent elements. The valve mechanism 20 is fluidly interposed in a fluid flow line between the fluid pumping device 2 and the system 4. The valve mechanism 20 is operable to control fluid flow between the fluid pumping device 2 and the system 4. The fluid pumping device 2 of this embodiment comprises a fuel pump that is an element of a modular reservoir assembly contained in a fuel tank (not shown). The system 4 comprises a fuel system for an internal combustion engine (not shown). In this embodiment, the fuel pump 2 is preferably controlled by an electronic controller (not shown) and is operable to continuously deliver a volume of pressurized fuel through the valve mechanism 20 to the fuel system 4 to operate the internal combustion engine, based upon demand for fuel from the engine. The fuel pump, modular reservoir assembly, fuel tank, demand fuel system, and controller are known to one skilled in the art.

Referring again to FIG. 2 and FIG. 3, FIG. 2 shows the embodiment of the valve mechanism 20 in an open position, under conditions described hereinafter. FIG. 3 shows the embodiment of the valve mechanism 20 in a closed position, which is preferably a default position. The valve mechanism 20 preferably comprises a valve body 24 including a fluid inlet 22, a first fluid outlet 42 and a second fluid outlet 40. The inlet 22 is fluidly connected to the fuel pump 2, the second fluid outlet 40 is fluidly connected to a fuel line fluidly connected to the fuel system 4, and the first outlet 42 is fluidly connected to a venturi pump 6 in the modular reservoir assembly (not shown), substantially adjacent to an inlet of the fuel pump 2. The valve mechanism 20 preferably comprises the first valve 12 fluidly linearly connected to the second valve 14, as described hereinabove with reference to FIG. 1.

The valve body 24 preferably comprises a rigid device that is substantially cylindrical in shape, with a circular cross-section. A bore 50 is formed through the length of the valve body 24, circular in cross-section, and coaxial with the longitudinal axis of the valve body 24. The bore 50 varies in diameter as described hereinafter. The first fluid outlet 42 is preferably fluidly connected to the bore 50 at a first end 46 of the valve body 24. The second fluid outlet 40 is preferably fluidly connected to the bore 50 at a second end 45 of the valve body 24. The inside of the valve body 24 is formed into a first valve seat 26 and a second valve seat 32, with a fluid flow channel 51 interposed therebetween. The second valve seat 32 is at an end of the bore 50 substantially near the second end 45 of the valve body 24. The first valve seat 26 is at an end of the flow channel 51 distal from the second valve seat 32. The first valve seat 26 and the second valve seat 32 each preferably comprises a tapered opening, and each has a circular cross-section. The second valve seat 32 includes the restricted fluid bypass 27, which preferably comprises a small depression in the second valve seat 32 parallel to the longitudinal axis of the valve body 24. Diameter of a portion of the bore 50 substantially near the first end 46 of the valve body 24 is preferably substantially greater than diameter of the first valve seat 26, the flow channel 51, and the second valve seat 32.

The second valve 14 preferably comprises a ball-type check valve, and includes a substantially spherically-shaped ball 28, the second valve seat 32, and a retaining screen 30. The ball 28 is of sufficient diameter to initially check flow of substantially all fluid from the second outlet 40 and the system 4 through the valve mechanism 20. The restricted fluid bypass 27 of the second valve seat 32 is operable to permit a small amount of fuel to flow past the ball 28 when the ball 28 closes against the second valve seat 32. Check valves, including design and sizing for flow and pressure drop requirements, are generally known to known to one skilled in the art. Operation of the second valve 14 is described hereinafter.

The first valve 12 preferably comprises a plunger 34 and the first valve seat 26. The plunger 34, comprising a cap 38 and a sealing end 36, is inserted in the first end 46 of the bore 50. The plunger 34 is oriented in the bore 50 to permit the sealing end 36 to join with the first valve seat 26 when in a closed position. The cap 38 of the plunger 34 is circular in cross-section and of a diameter substantially slightly less than the diameter of the portion of the bore 50 into which the cap 38 is inserted. Restriction 8, described with reference to FIG. 1, is created between the cap 38 and the portion of the bore 50 into which the cap 38 is inserted, in this embodiment. A chamber 48 is formed in the bore 50 between the cap 38 and the first valve seat 26. The inlet 22 comprises an opening through the valve body 24 that permits fluid flow to the chamber 48. The sealing end 36 of the plunger 34 is substantially adjacent to the first valve seat 26 and is operable to form a fluid seal between the first inlet 22 and the second outlet 40, under certain conditions described hereinafter. The compression spring 44 is placed between the plunger 34 and the first end 46 of the valve body 24, and is preferably in physical contact with the cap 38. The compression spring 44 is held in place by a port 52 inserted at the first fluid outlet 42. The compression spring 44 is operable to hold the plunger 34 in place and seal the sealing end 36 of the plunger 34 against the first valve seat 26. Spring force of the compression spring 44 is designed in relation to a first predetermined fluid pressure, described hereinafter.

There is an interaction between surface area of the cap 38 exposed in the chamber 48, the spring force exerted by the spring 44 acting on the plunger 34, and surface area of the sealing end 36 of the plunger 34 exposed to fluid in the channel 51 when the sealing end 36 is sealed against the first valve seat 26. Preferably, diameter of the channel 51 is sized according to system requirements for maximum quantity of fuel flowing from the fuel pump to the engine and required fuel pressure at the maximum quantity of fuel flow. A person skilled in the art is able to design elements of the first valve 12, including the first valve seat 26, the sealing end 36, and force applied by the spring 44 such that the first valve 12 effectively seals when pressure less than a second predetermined pressure is applied to the sealing end 36 through the channel 51 from the second outlet 40 of the valve. In this application, the second predetermined pressure is typically designed to be at or near 400 kPa. Surface area of the portion of cap 38 that is exposed to the chamber 48 is designed so the plunger 36 moves the sealing end 36 away from the first valve seat 26 and allows fuel to flow when exposed to the first predetermined pressure, as shown in FIG. 2. In this application, the first predetermined pressure is typically designed to be at or near 200 kPa. The resultant is that the area of the portion of the cap 38 exposed to the chamber 48 is approximately two times greater than the surface area of the sealing end 36. The diameter of the portion of the bore 50 substantially near the first end 46 of the valve body 24 is sized accordingly.

In operation, fluid flows between the fuel pump 2 and the fuel system 4 through the valve mechanism 20 in the follow manner. When no fluid pressure is applied to the valve mechanism 20 or in the system, the first valve 12 is in closed position with no fluid flowing, and the second valve 14 is typically closed when it is spring-biased, or if there is pressurized fluid in the system, as shown in FIG. 3. Under normal operation in this embodiment, the pump 2 pumps fuel from the fuel tank toward the fuel system 4, in response to a command signal from the controller (not shown). The first valve 12 remains closed until fluid pressure in the chamber 48 exceeds the first predetermined pressure. Fluid from the pump 8 may flow past the restriction 8 created between the cap 38 and the bore 50 at this time. When fluid pressure in the chamber 48 exceeds the first predetermined pressure, the fluid pressure against the cap 38 overcomes the force exerted on the cap 38 by the spring 44, causing the plunger 34 to move within the bore 50. When the plunger 34 moves within the bore, the sealing end 36 of the plunger 34 moves away from the first valve seat 26, as shown in FIG. 2. This movement of the sealing end 36 of the plunger 34 away from the first valve seat 26 allows fluid to flow through the channel 51, past the second valve 14, through the retaining screen 30, to the second outlet 40. The fuel line for the fuel system 4 is then pressurized accordingly. Under operating conditions when the controller causes the fuel pump 2 to decrease the volume of fuel pumped, such as during engine/vehicle deceleration, pressure in the chamber 48 drops, and the second valve 14 operates to immediately check backflow of fuel through valve mechanism 20 and maintain pressure in the fuel system 4. The fuel pump 2 typically continues to flow an amount of pressurized fuel to the valve mechanism 20, a substantial portion of which flows past the plunger 34 through the restriction 8 to the first outlet 42 and to the venturi pump 6. The flow of pressurized fluid from the pump 2 keeps the first valve 12 open. In so acting, fuel pressure is maintained in the system 4 during ongoing operation, and fluctuations in system pressure caused by the valve mechanism 20 are minimized.

When the pump 2 is shut down, such as happens when the engine is shut off, pressure in the chamber 48 typically drops. When pressure in the chamber 48 drops below the first predetermined pressure, the spring force of spring 44 causes the plunger 34 to move and the sealing end 36 seals against the first valve seat 26. (See FIG. 3 again.) The bypass 27 allows a small amount of fuel to flow between the ball 28 and the first valve seat 32. Pressure from fluid in the fuel system 4 is therefore exerted on the sealing end 36 of the plunger 34 of the first valve 12, which is closed by the action of the spring 44 against the plunger 34. The first valve 12 prevents fluid pressure in the system 4 from building up when the system is not operating (such as during vehicle shutdown when engine or vehicle conditions increase the fuel temperature in the fuel system). When fuel pressure in the system 4 exceeds the second predetermined pressure, the first valve 12 opens and relieves system pressure, until system pressure falls below the second predetermined pressure. There is typically some hysteresis in the opening and closing of the first valve 12 related to static friction of the plunger 34 in the valve body 24, which may affect opening and closing pressures of the first valve 12.

The cap 38 of the plunger 34 is further designed with restriction 8 to permit a small volume of pressurized fluid to flow past the cap 38 to the first end 46 of the valve, through the port 52, which is fluidly connected to the venturi pump 6 substantially adjacent the pump 2. The small volume of pressurized fluid flowing past the cap 38 is thus routed to the venturi pump 6 and provides motive force to operate the venturi pump 6. Flowing pressurized fluid through the orifice of the venturi pump 6 draws stationary fluid adjacent to the venturi pump 6 into a mixing body of the venturi pump 6, as is known to one skilled in the art. In this embodiment, proper operation of the venturi pump 6 requires a pressure drop of about 100 kPa across the orifice (not shown) of the venturi pump 6 for proper operation, and the restriction 8 across the valve and the venturi pump are designed accordingly. This is known to one skilled in the art.

The invention has been described with specific reference to the embodiment and modifications thereto. Further modifications and alterations may occur to others upon reading and understanding the specification. It is intended to include all such modifications and alterations insofar as they come within the scope of the invention.

Having thus described the invention, it is claimed:

1. A valve mechanism to control fluid flow between a fluid pumping device and a system, comprising:
   an inlet from the fluid pumping device, a first valve, a second valve, and a first outlet fluidly connected to the system;
   wherein the second valve is operable to substantially completely check fluid flow through the valve to the first outlet when fluid pressure at the inlet is less than a first predetermined pressure;
   wherein the second valve is operable to permit fluid flow from the fluid pumping device to the inlet and subsequently through the first outlet to the system only when fluid pressure at the inlet is greater than the first predetermined pressure;
   wherein the first valve is operable to prevent backflow of fluid from the system substantially immediately subsequent to the fluid pumping device discontinuing pumping fluid to the system; and,
   wherein the second valve is operable to prevent fluid pressure in the system from substantially exceeding a second predetermined pressure when the pumping device is not pumping fluid to the system.

2. The device of claim 1, wherein the second valve permits a limited portion of fluid from the fluid pumping device to flow to a second outlet of the valve mechanism.

3. The device of claim 2, wherein the second outlet of the valve mechanism is fluidly connected to a venturi pump.

4. The device of claim 3, wherein the venturi pump is substantially adjacent the fluid pumping device.

5. The device of claim 1, wherein the fluid pumping device comprises a fuel pump contained within a fuel tank, and, wherein the system comprises a fuel system for an internal combustion engine.

6. The device of claim 1, wherein the first valve comprises a ball check valve and a first valve seat.

7. The device of claim 6, wherein the first valve seat includes a fluid bypass.

8. The device of claim 1, wherein the second valve comprises a plunger and a second valve seat.

9. A method to control fluid flow between a fluid pumping device and a system, comprising:
   providing a valve mechanism, comprising an inlet from the fluid pumping device, a first valve, a second valve, a first outlet fluidly connected to the system, and a second outlet;
   wherein the second valve is operable to substantially completely check fluid flow through the valve to the first outlet when fluid pressure at the inlet is less than a first predetermined pressure;
   wherein the second valve is operable to permit fluid flow from the fluid pumping device to the inlet and subsequently through the first outlet to the system only when fluid pressure at the inlet is greater than the first predetermined pressure;
   wherein the first valve is operable to prevent backflow of fluid from the system substantially immediately subsequent to the fluid pumping device discontinuing pumping fluid to the system;
   wherein the second valve is operable to prevent fluid pressure in the system from substantially exceeding a second predetermined pressure when the pumping device is not pumping fluid to the system; and
   wherein the second valve permits a limited portion of fluid from the fluid pumping device to flow to the second outlet of the valve mechanism.

* * * * *